(No Model.)

J. W. TAYLOR.
VALVE GEAR.

No. 307,238. Patented Oct. 28, 1884.

WITNESSES:
Francis McArdle
C. Sedgwick

INVENTOR:
J. W. Taylor
BY Munn & Co
ATTORNEYS.

UNITED STATES PATENT OFFICE.

JOHN W. TAYLOR, OF PITTSTON, PENNSYLVANIA.

VALVE-GEAR.

SPECIFICATION forming part of Letters Patent No. 307,238, dated October 28, 1884.

Application filed January 19, 1884. (No model.)

*To all whom it may concern:*

Be it known that I, JOHN W. TAYLOR, of Pittston, in the county of Luzerne and State of Pennsylvania, have invented a new and Improved Valve-Gear, of which the following is a full, clear, and exact description.

My invention consists of a simple contrivance of a radially-grooved rocking disk worked by the eccentric, with the valve-rod and a shifting-lever and connections, whereby the valve-rod connected to said grooved rocking disk for being reciprocated by it to work the valve may be shifted along the groove of the disk to vary the length of the stroke of the valve, and may be shifted from one side of the disk to the other across the axis of the same to reverse the motion of the engine, thus making a simple variable cut-off and reversing-gear with a single eccentric, and dispensing with the link-motion commonly employed for the purpose, all as hereinafter fully described.

Reference is to be had to the accompanying drawings, forming part of this specification, in which similar letters of reference indicate corresponding parts in all the figures.

Figure 1:
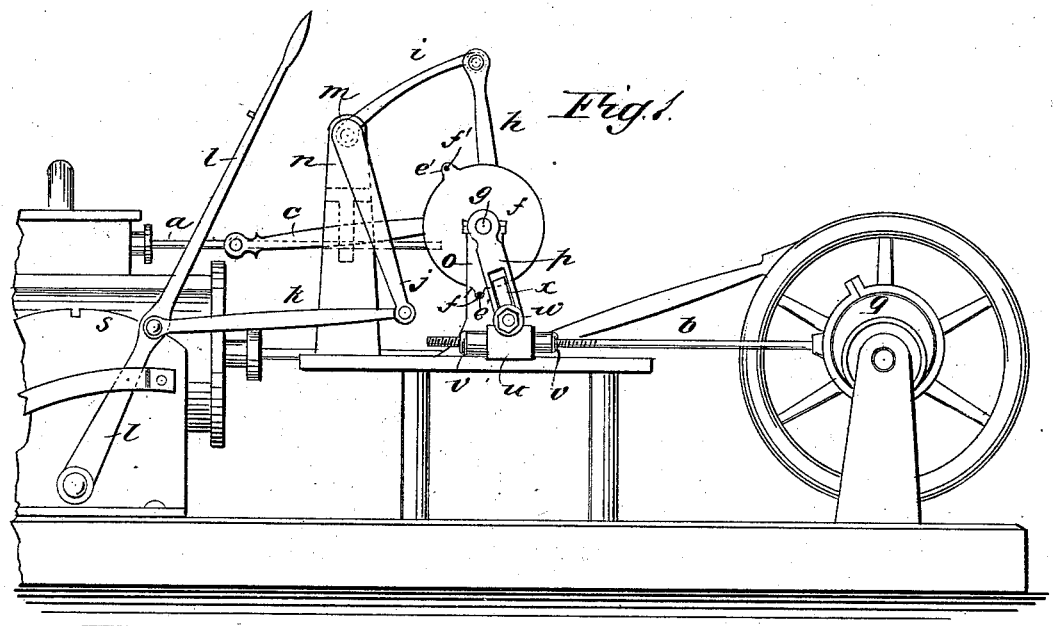
Figure 2:
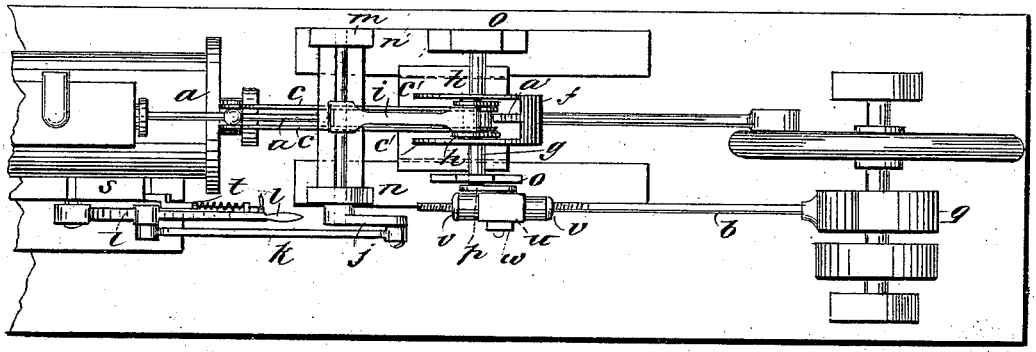
Figure 3:
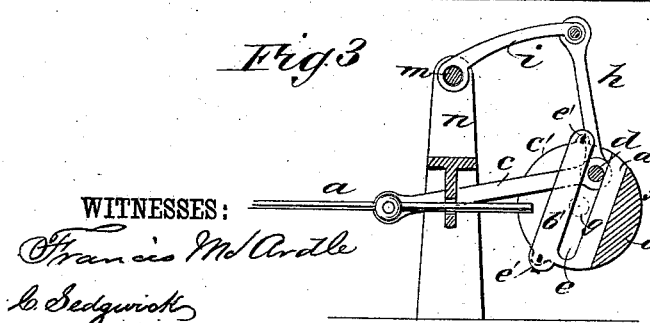

Figure 1 is a side elevation of a steam-engine contrived with my improved valve-gear. Fig. 2 is a plan view, and Fig. 3 is a detail of the said valve-gear in sectional elevation.

Instead of connecting the valve-rod *a* to the eccentric-rod *b*, I connect it to a rod, *c*, which I connect by a sliding pin or block, *d*, and a radial groove, *e*, in the disk *f* with said disk, in which the groove is made to traverse the disk from side to side, so that the pin or block *d* may shift along the groove toward or from the center of the disk on either side of the axis *g*, and said pin or block *d* may shift across said axis from one side to the other radially. The said pin or block *d* is connected by a link, *h*, with the arm *i* of a bell-crank, whose other arm, *j*, is connected by a link, *k*, with a shifting-lever, *l*, said bell-crank being pivoted at its angle *m* at the top of supporting-posts *n*, so that the arm *i* may swing up and down readily to cause the pin or block *d* to traverse the grooved disk *f*. The disk *f* is mounted on suitable bearing-supports, *o*, by its pivot-shaft *g*, and said shaft has a crank-arm, *p*, attached to it, to which arm the eccentric-rod *b* is connected for rocking or oscillating the disk by the motions of a single eccentric, *q*. The shifting-lever has the usual notched catch-bar, *s*, and trip-latch *t*, for securing the lever in any desired position for holding the block or pin *d* in any position where it may be required to set it along the groove *e* for the desired length of stroke of the valve, and on either side of the center of the disk *f*, according to which way the engine is desired to run.

It will be understood that, the disk *f* being oscillated uniformly by the eccentric, its respective sides opposite each other across the axis will simultaneously swing in opposite directions, so that the valve will lead the driving-crank in reverse direction, according to which side the block or pin *d* may be set to the axis of disk *f*, and thus the motion of the engine will be reversed by shifting the block or pin *d* from one side to the other of said disk. It will also be seen that the travel of the valve will be lengthened or shortened, according as the block or pin *d* is shifted from or toward the axis of the disk, which varies the cut-off accordingly, enabling the steam to be worked more or less expansively, according to the load of the engine; and it will also be seen that the engine-valve may also be used for stopping and starting the engine, for when the pin or block *d* is set at the center of the disk the valve will cover both steam-ports and the engine will cease to run. The valve will be opened to start the engine by shifting the block or pin *d* outward in the groove of the disk one way or the other, according to which way it is desired to run the engine.

I prefer to connect the eccentric-rod *b* to the crank-arm *p* by an adjusting-sleeve, *u*, and nuts *v*, for readily adjusting them; also, to fit the connecting-pin *w* to the crank by a sliding block, *x*, for shifting said pin along the crank when it may be desired; and for the construction of the disk *f*, I prefer to form the groove *e* for the block or pin *d* between the edges of bars *a'* and *b'*, located at the center between the two side plates, *c'*, bar *a'* being joined with the solid metal *d'* of the disk at the bottom of the space between the sides *c'*, and bar *b'* connected at the ends by stud-bolts *e'* with ears *f'* of the sides *c'*, which enables the connecting-rod *c*, also the link *h*, to consist of two parallel bars, which may connect with the pin *d* at the ends each side of bars $a'$ and $b'$, and the arm $i$ may be connected between the two bars of the link $h$; but I do not limit myself to the particular construction of the disk.

Having thus described my invention, I claim as new and desire to secure by Letters Patent—

1. The grooved rocking disk $f$, crank-arm $p$, and the eccentric-rod $b$, combined with the sliding block or pin $d$, valve-rod $a$, connecting-rod $c$, elbow-lever $i\ j$, link $h$, connecting-rod $k$, and the shifting and reversing lever $l$, said crank-arm $p$, crank-pin $w$, and the valve-rod $b$ being adjustably connected, substantially as described.

2. The groove $e$ for the shifting pin $d$, formed between bars $a'$ and $b'$, arranged in the middle space between sides $c'$ of the disk, in combination with link $h$ and connecting-rod $c$, consisting of parallel bars connected to the ends of the pin each side of said bars $a'$ and $b'$, substantially as described.

3. The combination, with the valve-rod and the sliding block $d$, connected together as shown, of the rocking disk $f$, slotted crank-arm $p$, and the eccentric arm $b$, connected to the said crank-arm by the sleeve $u$, having the crank-pin $w$, and block $x$ within the slotted crank-arm, and the adjusting-nuts $v$ on either side of the sleeve $u$, substantially as set forth.

JOHN W. TAYLOR.

Witnesses:
S. P. FENN,
F. H. KYTE.